Dec. 29, 1953  R. M. PAGE  2,664,522
OSCILLOGRAPH SWEEP SYSTEM
Original Filed April 9, 1942  2 Sheets-Sheet 1
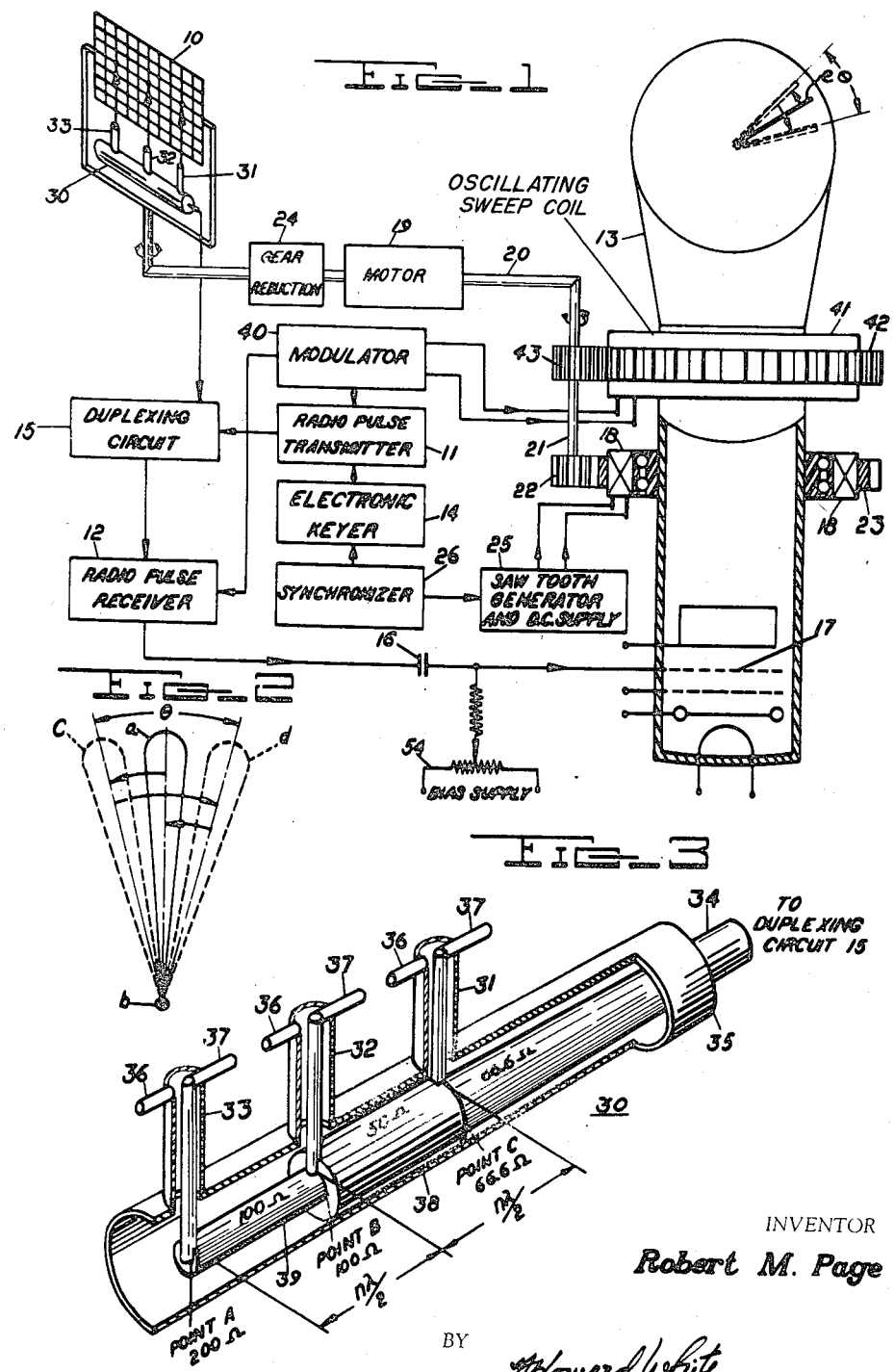
INVENTOR
Robert M. Page
BY Howard White
ATTORNEY Dec. 29, 1953      R. M. PAGE      2,664,522
OSCILLOGRAPH SWEEP SYSTEM
Original Filed April 9, 1942       2 Sheets-Sheet 2
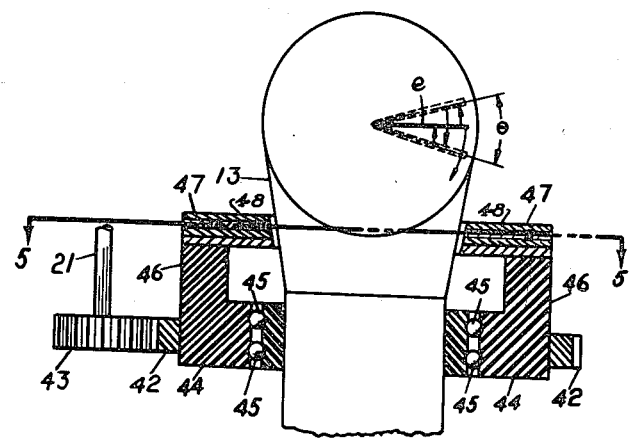
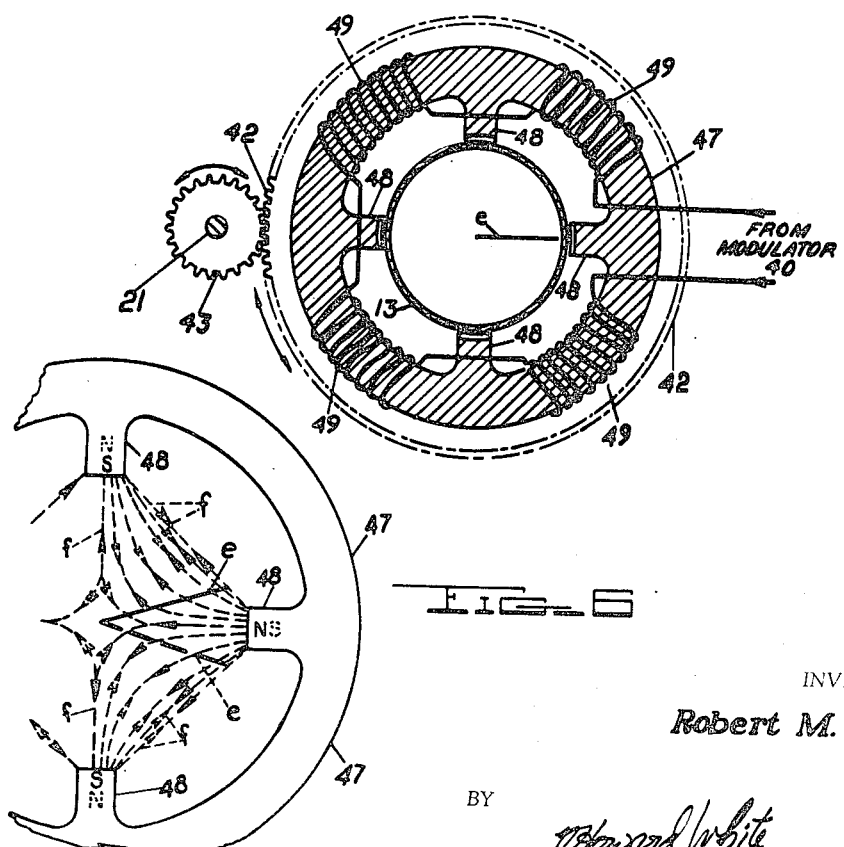
INVENTOR
Robert M. Page
BY
Howard White  ATTORNEY Patented Dec. 29, 1953

2,664,522

UNITED STATES PATENT OFFICE 2,664,522

OSCILLOGRAPH SWEEP SYSTEM

Robert M. Page, Camp Springs, Md.

Original application April 9, 1942, Serial No. 438,321. Divided and this application June 13, 1952, Serial No. 293,489

4 Claims. (Cl. 315—24)

(Granted under Title 35, U. S. Code (1952), sec. 266)

This invention relates to radio echo ranging apparatus and more particularly to an apparatus for producing indications of range and direction of remote objects.

This application is a division of my copending application Serial No. 438,321, filed April 9, 1942, and entitled Radio Echo Ranging Apparatus.

Certain radio echo ranging apparatuses disclosed in the prior art produce instantaneous indications on an oscillograph of the range of remote objects included within a limited field, and wherein measurements of azimuth of such remote objects are derived from the angular positino of the directional beam antenna with respect to a reference line. With a system of the foregoing type, when it is desired to determine the range of remote objects within a field extending 360° about the apparatus, it becomes necessary to rotate the antenna throughout 360° and to produce a diagram represent'ng remote objects at specific ranges and directions as indications thereof appear on the oscillograph for certain angular positions of the antenna. The foregoing method is not feasible, since a substantially long period of time is required to produce such a diagram, during which time remote objects previously detected and plotted will have moved from their previous position before the diagram is completed. Moreover, directional indications derived from the angular pos'tion of the antenna are not of a high degree of accuracy and consequently cannot be relied upon for controlling numerous instruments.

Other prior radio echo ranging apparatuses provide a radial sweep on the oscillograph which is caused to rotate in synchronism with the directional beam antenna from wh'ch representations of range and direction of remote objects within a field extending 360° about the apparatus may be more readily obtained. With the above type of apparatus persistent vision of range and directional indications of remote objects may be obtained by rotat'ng the antenna and the radial sweep at a high rate of speed. However, since the antennae of radio echo ranging apparatuses are necessarily large and bulky structures, extreme difficulties arise when attempting to rotate the same at the required rate of speed.

It is therefore an object of the present invention to provide a radio echo ranging apparatus for producing persistent indications of range and direction of remote objects within a field extending 360° about the apparatus.

Another object is to provide novel means for causing the beam of electrical energy to continually oscillate.

Another object is to provide a directional beam antenna coupled to a radio frequency transmitter for producing a beam of radio frequency energy with means associated with the antenna responsive to frequency modulation of the transmitter for deflecting the beam.

Another object is to provide an apparatus of the above type so characterized as to cause the beam to continually oscillate in response to cont'nuous periodic frequency modulation of the transmitter.

Still another object of the invention is to provide a directional beam antenna comprising a plurality of radiating elements or antenna sections with novel means serially feeding the antenna sections w'th the output of a radio frequency transm'tter in such a manner that the current in each section is in the same phase as the current in other sections when the output of the transmitter is at a predetermined frequency, and including novel means for producing phase shifts of the current at each antenna section in response to var'ations of the frequency of the transmitter output for deflecting the beam.

Still another object is to provide an antenna arrangement having the foregoing characteristics with the means feeding the antenna sections comprising a plurality of transformer sections having equal values of Q positioned between the antenna sections.

Still another object is to provide a radio echo ranging apparatus including a directional beam antenna interconnected with a radio frequency transmitter for producing a beam of radio energy, with means associated w'th the antenna for causing the beam to continuously oscillate in response to continuous periodic frequency modulation of said transmitter, and the apparatus further including a sweep circuit for producing a radial sweep on an osc llograph rotating in synchronism with the antenna with means associated with the oscillograph for causing the sweep line to oscillate in synchronism with oscillation of the antenna beam.

Still another object is to provide an apparatus of the above type hav'ng a magnetic circuit associated with the oscillograph for producing a periodically varying magnetic field in accordance with the frequency modulation of the transmitter for causing the radial sweep line to continually oscillate, in synchron'sm with the beam.

Other objects and features of the invention will appear more fully from the following detailed description when considered in connection with the accompanying drawings which disclose several embodiments of the invention. It is to be expressly understood, however, that the drawings are designed for purposes of illustration only and not as a definition of the limits of the invention, reference for the latter purpose being had to the appended claims.

In the drawings wherein similar reference characters denote similar elements throughout the several views:

Fig. 1 is a diagrammatic showing of a radio echo ranging apparatus embodying the principles of the invention;

Fig. 2 is a diagrammatic illustration of the propagation of the beam of electrical energy produced by the apparatus disclosed in Fig. 1;

Fig. 3 is a diagrammatic showing of a novel transmission line utilized in connection with the apparatus disclosed in Fig. 1;

Fig. 4 is a diagrammatic showing, partly in section, of a magnetic circuit arrangement associated with the oscillograph as shown in Fig. 1;

Fig. 5 is a cross-sectional view through line 5—5 of Fig. 4, and

Fig. 6 is a diagrammatic showing of the magnetic field produced by the circuit disclosed in Figs. 4 and 5.

With reference more particularly to Fig. 1 of the drawing, a radio echo ranging apparatus embodying the principles of the present invention is disclosed therein including a rotatable directional beam antenna 10, a radio pulse transmitter 11, a radio pulse receiver 12 and a suitable indicator such as a cathode ray oscillograph 13. Radio pulse transmitter 11 is tuned to a predetermined carrier frequency which is modulated by a suitable high speed electronic keyer 14 to generate a radio pulse output that is fed through a channel of duplexing circuit 15 to antenna 10 thus producing a directional beam of radio energy comprising radio pulses that propagate at a predetermined rate.

Antenna 10 is to be of any conventional directional type having a plurality of radiating elements or antenna sections, not shown, while radio pulse transmitter 11 and radio pulse receiver 12 are to be designed in such a manner to respectively transmit and receive radio pulses, such as the type of transmitters and receivers employed in commercial television systems. Duplexing circuit 15 functions to automatically control individual connections between antenna 10 and the transmitter or receiver. A circuit constructed in accordance with the principles disclosed in the application of Leo C. Young and Robert M. Page, Serial No. 326,640, filed March 29, 1940, for Impedance Control Coupling and Decoupling Systems adequately serves this purpose. When antenna 10 is so directed that the radio pulses emitted therefrom impinge upon remote objects, the radio pulses are reflected from such objects in the form of echo pulses. The echo pulses are received at antenna 10, passed through another channel of duplexing circuit 15 to radio pulse receiver 12 wherein the echo pulses are suitably amplified. The output of receiver 12 is fed through capacitance 16 and applied on control grid 17 of oscillograph 13.

In order to produce indications of range and direction of remote objects, in response to application of echo pulses on grid 17, a sweep circuit is provided for producing a radial sweep or a radial trace e on the screen of oscillograph 13 which rotates in synchronism with rotation of antenna 10. As shown in Fig. 1, a cylindrical deflection coil 18 is rotatably mounted on the oscillograph and is adapted to rotate in synchronism with rotation of antenna 10. For this purpose, motor 19 is provided which rotates deflection coil 18, by means of shafts 20 and 21, pinion 22 and annular gear 23, while synchronous rotation of antenna 10 is provided through reduction gearing 24. In order to produce a radial sweep on the oscillograph screen, saw-tooth wave generator 25 is provided which supplies saw-tooth varying current to deflection coils 18 with a suitable D. C. supply to produce a radial sweep which initiates at the center of the oscillograph screen. As in conventional radio echo ranging apparatuses, a suitable synchronizer 26 is provided in order to start each sweep line at substantially the same instant that radio pulses are generated at transmitter 11 so that accurate indications on range of remote objects may be obtained. Synchronizer 26 has connections with electronic keyer 14 and saw-tooth wave generator 25 in order to obtain such synchronous operation. With the foregoing arrangement, upon application of an echo pulse on grid 17, a pulse indication appears on sweep line e at a distance from the center of the oscillograph screen that is a direct measurement of the range of the remote object from which the echo pulse was reflected, while the angular position of the sweep line, which corresponds to the angular position of antenna 10, represents the direction of such object.

As stated heretofore, it is an object of the present invention to provide a radio echo ranging apparatus that is capable of producing persistent indications of range and direction of remote objects included within a field extending 360° about the apparatus. In order to accomplish the foregoing, novel means are provided for causing the beam of radio energy emitted from antenna 10 to continually oscillate in a fixed arc, at a high rate of speed, without movement of antenna 10, so that the radio pulses will impinge upon remote objects included in the field of the arc described by the oscillating beam. Such oscillation of the beam is diagrammatically illustrated in Fig. 2 wherein *a* represents the position of the beam normal to antenna 10, when antenna 10, designated at point *b*, is directed upwardly as viewed in the drawing, while *c* and *d* represent the positions that the beam occupies at the outer extremities of the angle θ through which the beam continually oscillates. In accordance with the principles of the present invention, means are also provided for causing the radial sweep *e* produced on the screen of oscillograph 13, to oscillate through an angle θ equal to the angle through which the beam oscillates, as shown in Fig. 1, and for causing the radial sweep, or trace *e* and the antenna beam, to oscillate in synchronism. Echo pulse indications are thus produced on the oscillograph screen which correspond to radio pulse reflections from all remote objects included in the angular field through which the beam oscillates. It is contemplated by the present invention to cause the beam of radio energy and the radial sweep to oscillate at a sufficient rate of speed so that persistent pulse indications appear on the screen of the oscillograph. It is to be expressly understood, that with a construction of the foregoing character, persistent indications of range and direction of remote objects included in a field extending 360° about the apparatus may be readily obtained, since it would not be necessary to rotate antenna 10 at a very high rate of speed, as was necessary in prior systems. Continuous oscillation of the antenna beam through angle θ allows the speed of rotation of antenna 10 to be substantially reduced while still maintaining persistent indications on the oscillograph. Moreover, with an apparatus including novel means for continually oscillating the antenna beam and the radial sweep in synchronism, continuous scanning of a sector, equal to the angle through which the antenna beam oscillates, is obtained independently of the speed of rotation of antenna 10. Also, by oscillating the antenna beam and the radial sweep line at a sufficient rate, persistent indications of remote objects included within the angular field through which the antenna beam oscillates are continually obtained independently of rotation of antenna 10.

Novel means, such as claimed in my copending application Serial No. 293,488, filed concurrently herewith as a further division of my patent application Serial No. 438,321, filed April 9, 1942, are associated with antenna 10 for causing the beam of radio energy emitted therefrom to occupy a position $a$, as shown in Fig. 2, when transmitter 11 is tuned to a predetermined carrier frequency, while causing the beam to deflect toward either position $c$ or $d$ when the carrier frequency of transmitter 11 is increased or decreased from such predetermined frequency. Such means functions, in response to variations of the carrier frequency of transmitter 11, to produce certain shifts in phase of the currents induced in the radiating elements or antenna sections of antenna 10 for producing such antenna beam deflection. As will appear more fully hereinafter, the currents induced in the radiating elements are progressively shifted in phase in direct proportion to the extent of frequency variation from the predetermined or mean frequency value, with the currents progressively retarded or advanced in phase in accordance with the direction that the carrier frequency varies from the mean frequency value thereof. With reference again to Fig. 1 of the drawings, the foregoing means comprises a novel transmission line 30 which includes a series of feed lines 31, 32 and 33 each of which are connected to a radiating element or an antenna section of antenna 10. The output of duplexing circuit 15 feeds into one end of transmission line 30 so that the various radiating elements of antenna 10 are serially fed with the radio energy output of transmitter 11. Transmission line 30 is shown in greater detail in Fig. 3. As shown, the transmission line is in the form of a concentric line comprising central conductor 34 and an outside conductor 35, both having connections with duplexing circuit 15. Feed lines 31, 32 and 33 are likewise disclosed as concentric lines having the central and outside conductors thereof respectively connected to conductors 34 and 35 of the transmission line. In order to more fully illustrate the manner that transmission line serially feeds the various radiating elements of antenna 10, feed lines 31, 32 and 33 are shown having connections with conventional dipole radiators each of which include radiating members 36 and 37. When dipole radiators are utilized as radiating elements, feed lines 31, 32 and 33 are to be equal to quarter wave sections of a certain frequency, but it is to be expressly understood that other types of radiating elements may be employed.

The novel means included in transmission line 30, that is responsive to variations of the carrier frequency of transmitter 11 for deflecting the beam of radio energy, comprises transformer sections 38 and 39 which are respectively positioned between the central electrodes of feed lines 31 and 32 and between the central electrodes of feed lines 32 and 33. In order to produce a beam of radio energy that extends outwardly from antenna 10 at right angles thereto, when the carrier frequency of transmitter 11 is tuned to a predetermined frequency, transformer sections 38 and 39 are equal in length to an integral multiple of half-wave lengths, with the wave length corresponding to such predetermined frequency. With such an arrangement, when the carrier frequency is equal to the above mentioned predetermined frequency, currents induced in feed lines 31, 32 and 33 and in the radiating elements respectively associated therewith, will be in the same phase relation with respect to the current induced in the other feed lines, and consequently, the directional beam of radio energy of antenna 10 extends outwardly therefrom at right angles thereto. In order to produce a progressive shift in phase along the series of feed lines 31, 32 and 33, upon variation of the carrier frequency of transmitter 11 from the predetermined frequency value, transformer sections 38 and 39 are designed to have substantially large values of Q, since the value of Q determines the degree of phase shift for a certain variation in frequency. Furthermore, transformer sections 38 and 39 are to have equal values of Q so that the degree of phase shift between adjacent feed lines or radiating elements are equal to thus obtain uniform progressive phase shift along the series of radiating elements which consequently produces a uniform deflection of the antenna beam. The value of Q for transformer sections 38 and 39 is equal to the ratio of the characteristic impedance value and the load impedance value of the transformer sections. Since, as heretofore stated, transformer sections 38 and 39 have equal values of Q, the ratios of the characteristic impedance values of the transformer sections to the load impedance values thereof, or to the impedance values at the points where the transformer sections terminate, are also equal.

The foregoing may be more readily understood by designating hypothetical impedance values for certain elements of transmission line 30. By assuming that the combined characteristic impedance of feed lines 31, 32 and 33 and the radiating elements 36 and 37 associated with each feed line is equal to 200 ohms, as seen looking toward radiating elements 36, 37 from points A, B or C, the load impedance of transformer section 39 is thus equal to 200 ohms. By further assuming a 2 to 1 ratio between the characteristic impedance values of the transformer sections and the impedance value at the points where such sections terminate, the characteristic impedance value of transformer section 39 will therefore be 100 ohms. Since feed lines 32 and 33 are in parallel relation, the impedance value at point B, the point where transformer section 39 terminates, or the load impedance of transformer section 38, is equal to 100 ohms. Continuing the same ratio of impedance values the characteristic impedance of transformer section 38 is therefore 50 ohms. Furthermore, since feed line 31 is in parallel relation with feed lines 32 and 33, the impedance value at point C is approximately equal to 66.6 ohms, and, by utilizing a line from duplexing circuit 15 having an impedance value equal approximately to 66.6 ohms transmission line 30 is properly matched. It can be readily seen, therefore, with the foregoing assumed impedance values, that the values of Q for transformer sections 38 and 39 are equal. Such assumed impedance values, and resulting values of Q, are shown for purposes of clarity only, and are not to be construed as limiting factors. Moreover, the length of transformer sections 38 and 39 are not limited to integral multiple half-wave sections, but may comprise integral multiple quarter-wave sections, in which case greater shifts in phase are obtained for certain impedance values and for certain degrees of frequency variation. It is to be expressly understood that the novel means included in transmission line 30, for deflecting the antenna beam in response to variations of the carrier frequency, may be readily employed in a transmission line utilized for feeding a plurality of antenna radiating elements in parallel relation whereby antenna beam deflection in response to frequency variations may be obtained. In such an arrangement, the values of Q for the transformer sections are selected to produce phase shifts of the currents induced in the radiating elements, in the same direction, upon certain variations in frequency.

When a source of radio energy, at a frequency corresponding to the wave lengths of the integral multiple half-wave transformer sections 38 and 39, is applied to antenna 10 through transmission line 30, the currents induced in feed lines 31, 32 and 33, and in the radiating elements associated therewith, are in phase with each other to thus produce a beam of radio energy which extends outwardly from the antenna at right angles thereto, as shown by beam a in Fig. 2. The dotted line x—y indicates the orientation of dipoles 36—37 at point b. When the frequency of the source of radio energy applied to transmission line 30 is varied in a certain direction from the predetermined or mean frequency value, the currents induced in feed lines 31, 32 and 33 are progressively advanced or retarded in phase along the series of feed lines. Such progressive phase variations of the currents applied to the feed lines and to the radiating elements associated therewith cause the beam of radio energy to deviate in a certain direction, toward position c as shown in Fig. 2, for example, in direct proportion to the degree of progressive phase variation. Since transformer sections 38 and 39 are equal in length to an integral multiple of half-wave lengths that correspond to the predetermined carrier frequency, transmission line 30 will only have proper impedance matching when the radio energy applied thereto is at such predetermined frequency. When the carrier frequency of transmitter 11 is varied, transmission line 30 becomes reactive, and, since the values of Q of transformer sections 38 and 39 are equal, such reactive effect uniformly progressively varies along the series of feed lines to thus produce the uniform progressive phase shift. As the frequency of the source of radio energy applied to transmission line 30 is varied in the opposite direction from the predetermined frequency, a uniform progressive phase shift along the series of feed lines 31, 32 and 33 occurs in a direction opposite the progressive phase shift mentioned heretofore thus causing the beam of radio energy from antenna 10 to likewise deviate in an opposite direction, toward position d as shown in Fig. 2.

In order to vary the carrier frequency of transmitter 11, to cause the beam of radio energy to continually oscillate through an angle as indicated in Fig. 2, a suitable modulator 40 is provided. Modulator 40 is of such construction to periodically vary the carrier frequency of transmitter 11, about a mean frequency that is equal to the aforementioned predetermined frequency. Assuming the carrier frequency of transmitter 11 to be equal to the above mentioned predetermined frequency the beam will occupy position a, as shown in Fig. 2. As modulator 40 operates, the carrier frequency decreases from the predetermined carrier frequency to deviate the beam toward the position thereof designated at c, and when the frequency is decreased to a value to deviate the beam a sufficient extent to occupy a position c modulator 35 automatically functions to increase the carrier frequency of transmitter 11, thus causing the beam to swing in the opposite direction until the opposite extremity of angle θ is reached as shown by position d. Modulator 40 thus functions automatically to periodically vary the carrier frequency of transmitter 11 about a mean or a predetermined frequency. The carrier frequency is varied from the mean frequency to a certain frequency value less than the mean frequency and is then increased from the low frequency value to a frequency value greater than the mean frequency by a degree equal to the extent of frequency variation to the low frequency value. Since the carrier frequency of transmitter 11 continually varies between fixed frequency values that are equally greater and less than the predetermined frequency, the beam of radio energy from antenna 10 continually oscillates through angle θ as shown in Fig. 2. Modulator 40 also functions to modulate radio pulse receiver 12 in a corresponding manner. Modulation of receiver 12 is necessitated, since the echo pulses reflected from remote objects included within the field through which the beam of radio energy continually oscillates are of different frequencies due to the frequency modulation of transmitter 11. Therefore, by synchronously modulating transmitter 11 and receiver 12, the latter is rendered in a condition to receive and properly amplify the echo pulses of varying frequencies. If desired, receiver 12 may be constructed in such a manner to possess sufficiently broad band pass characteristics in order to be responsive to all the frequencies of the echo pulses, in which case, modulation of the receiver would not be necessary.

As stated heretofore means are provided for causing the sweep line of radial trace e produced on oscillograph 13 to oscillate, in synchronism with oscillation of the beam of radio energy, through an equal angle θ. As shown in Fig. 1, such means comprises a magnetic device 41 rotatably mounted on oscillograph 13. Magnetic device 41 is supplied with current from modulator 40, which varies in accordance with the frequency variations of tranmitter 11, to cause the radial sweep line e to oscillate in synchronism with oscillation of the beam of radio energy, and the device is caused to rotate in synchronism with rotation of antenna 10 by means of annular gear 42 and pinion 43, the latter being connected to shaft 21. In Figs. 4 and 5 device 41 is disclosed in greater detail. As shown, the device comprises a cylindrical member 44, of insulating material, rotatably mounted on oscillograph 13 by means of anti-friction bearings 45. Annular gear 42 is positioned on the outer periphery of member 44 and cooperates with pinion 43 to cause the member to rotate in synchronism with rotation of antenna 10. Member 44 includes an upwardly extending cylindrical portion 46, likewise of insulating material, upon which is mounted a magnetic core 47 having a plurality of inwardly extending portions 48, disposed 90° with respect to each other and terminating adjacent oscillograph 13, as shown more particularly in Fig. 5. Core 47 may comprise a plurality of laminated disc-like members, or may be constructed of any suitable material. A plurality of coils 49 are associated with core 47, each of which occupies a position between a pair of inwardly extending members 48. Coils 49 are connected in series and are alternately wound in opposition for producing alternate north and south magnetic poles at extending portions 48 when current of a certain polarity is applied thereto, and for reversing the magnetic polarity of the extending portions when current of opposite polarity is applied to the coils. Magnetic fields are thus produced between adjacent pairs of extending portions 48 with the direction of the magnetic lines of force thereof alternately varying as the polarity of the applied current alternates. As shown in Fig. 1, magnetic device 41 and deflecting coils 18 are mounted about oscillograph 13 in such a manner that radial sweep line $e$ normally propagates, when no current is applied to coils 49, in a direction toward an intermediate point on one of extending portions 48. Since magnetic device 41 and deflection coils 18 rotate in synchronism about the oscillograph, the foregoing direction of propagation of sweep line $e$ is continually maintained. When a source of current of a certain polarity is applied to coils 49, the magnetic field produced thereby between two pairs of adjacent extending portions 48 functions to uniformly deflect sweep line $e$ in a certain direction, by an amount proportional to the value of the applied current. When the polarity of the applied current is reversed, the magnetic lines of force between adjacent pairs of extending portions 48 likewise change direction to deflect sweep line $e$ in an opposite direction.

In order to uniformly deviate radial sweep line $e$ in a direction proportional to the polarity and value of current applied to coils 49 the strength of the magnetic field produced between adjacent pairs of extending portions 48 uniformly increases from the center of the oscillograph to the outer periphery thereof. As shown in Fig. 6, the magnetic lines of force $f$, between adjacent pairs of extending portions 48 are shown by broken lines having unequal radial distances therebetween in order to indicate the varying magnetic strength thereof. Core 47 and coils 49 associated therewith are to be of such construction that the strength of the magnetic fields are substantially zero at the center of the oscillograph, thus producing no force to deviate the sweep line at the beginning of propagation thereof, with uniformly increasing strength, to uniformly increase deviation of the sweep line as the latter propagates toward the periphery of the oscillograph. When current of a certain polarity is applied to coils 49 the direction of the magnetic field between adjacent pairs of extending portions 48, as shown by the full arrows, deviates sweep line $e$ in an upward direction, as viewed in the drawing; when the polarity of the applied current is reversed, the direction of the magnetic lines of force is likewise reversed, as shown by the broken arrows, to deviate the sweep line in an opposite direction to a position shown in broken lines. It is to be expressly understood, therefore, that the foregoing construction provides means for uniformly deflecting radial line sweep $e$, in direction and degree respectively proportional to the polarity and value of current applied to coils 49.

When modulator 40 is in a condition so that the output of transmitter 11 is at the aforementioned predetermined carrier frequency the beam from antenna 10 will extend therefrom at right angles thereto as shown by $a$ in Fig. 2. At this instant modulator 40 does not function to supply current to coils 49 and line sweep $e$ on oscillograph 13 is not affected. However, as modulator 40 functions to vary the frequency of transmitter 11 to cause the beam from antenna 10 to deviate in a certain direction, toward position $c$ in Fig. 2 for example, modulator 40 simultaneously functions to supply a source of current, of a certain polarity to coils 49 at a rate proportionate to the degree of variation of the carrier frequency of transmitter 11. Such current supplied to coils 49 produces a magnetic field within oscillograph 13 that causes the radial line sweep $e$ to deviate in a direction similar to the direction of deviation of the beam and by a corresponding amount. When modulator 40 functions to cause the antenna beam to deviate from the normal position thereof in a direction toward position $d$ in Fig. 2, the polarity of the current applied to coils 44 is reversed and applied thereto, at a rate proportional to the degree of frequency variation, to deviate radial line sweep $e$ in a similar direction and by a corresponding degree. Modulator 40 thus functions to periodically apply varying currents of alternate polarities to coils 49, while simultaneously periodically modulating the carrier frequency of transmitter 11 between certain frequency values equal degrees greater and less than the mean or predetermined frequency value. The radial line sweep $e$ produced on oscillograph 13 is therefore caused to continually oscillate through angle $\theta$ in synchronism with oscillation of the beam of radio energy through an equal angle.

Operation of the radio echo ranging apparatus disclosed in Fig. 1 is as follows:

Modulator circuit 40 functions to vary the carrier frequency of transmitter 11 in such a manner that a beam of radio energy is produced which extends outwardly from antenna 10 and which continually oscillates through an angle $\theta$ as shown in Fig. 2. Since modulator 40 also simultaneously supplies varying currents of alternate polarity to magnetic device 41, the radial sweep line $e$ produced on oscillograph 13, upon application of saw-tooth wave forms to deflection coils 18, oscillates through an equal angle $\theta$, in synchronism with oscillation of the antenna beam. Electronic keyer 14 functions to modulate the output of transmitter 11 so that the beam of radio energy from antenna 10 comprises radio pulses propagating at a constant rate controlled by synchronizer 26; the latter also functions to control operation of saw-tooth wave generator 25 in such a manner that the radial sweep lines are initiated at substantially the same instant that radio pulses are emitted from antenna 10. Whenever radio pulses emitted from antenna 10 in the foregoing manner impinge upon remote objects within the angular field through which the beam continually oscillates, the pulses are reflected from the objects in the form of echo pulses of certain frequencies determined by the frequency of the beam. Since radio pulse receiver 12 is modulated in synchronism with modulation of transmitter 11, by means of modulator 40, the receiver is capable of responding to and properly amplifying the reflected echo pulses, although the latter are at different frequencies. It is to be expressly understood, however, as mentioned heretofore, that receiver 12 may be constructed in such a manner as to have suitable band pass characteristics so that the latter will respond to all frequencies within the range of frequency variation of transmitter 11. The pulse output of receiver 12 is passed to grid 17 of oscillograph 13 and echo pulse indications are produced on sweep line e in a manner well understood by those skilled in the art. Since generation of radio pulses and the radial sweep are properly synchronized, and, moreover, since the beam of radio energy and the radial sweep line e are caused to oscillate in synchronism, the pulse indications produced on radial sweep line or radial trace e correspond to range and direction of remote objects included within the angular field through which the beam oscillates from which echo pulses were reflected. Bias control 54 may be operated to reduce the intensity of the radial sweep line e so that only the echo pulse indications are produced on the oscillograph screen.

When antenna 10 is caused to rotate upon operation of motor 19, deflecting coil 18 as well as magnetic device 26 are caused to rotate in synchronism therewith. The oscillating beam of radio energy from antenna 10 is thus caused to rotate while the synchronously oscillating sweep line e is rotated in synchronism therewith. In this manner, radio pulses emitted from antenna 10 are caused to impinge upon all remote objects within a field extending 360° about the antenna and echo pulse indications thereof are produced on oscillograph 13 from which range and directional measurements may be obtained. If the antenna is rotated slowly, persistent vision of range and directional indications of such objects within an angular field θ are constantly maintained since the beam is continually oscillating at a high rate of speed. In order to obtain persistent vision of all objects within the complete field of the antenna, the speed of rotation of the antenna, and consequently radial sweep line e, is increased. Since persistent vision of range and directional indications throughout an angle θ is constantly provided, it is to be expressly understood that the necessary speed of rotation of antenna 10, in order to provide persistent indications throughout 360°, is substantially reduced with respect to the necessary speed required in apparatuses of the type wherein continuous beam deflection is not provided. The speed of rotation of the antenna is reduced a sufficient amount so that the same may be readily rotated at the necessary speed even though the antennae required for this type of apparatus are necessarily large structures. As mentioned heretofore, the intensity of radial sweep line e may be reduced by adjustment of bias supply 54 so that only persistent indications of echo pulse indications are produced on the oscillograph screen. By employing suitable polar coordinates on the oscillograph screen, range and direction of remote objects corresponding to such indications may be accurately obtained.

There is thus provided by the present invention novel means for continually deflecting a beam of radio energy. Such means comprises a novel transmission line for serially feeding the various antenna sections or radiating elements of a directional beam antenna and for varying the phases of the currents induced in each section in response to frequency modulation of the radio frequency source supplied thereto, thus causing the beam of the antenna to oscillate in accordance with such frequency modulation. Moreover, the present invention provides a novel radio echo ranging apparatus employing the novel beam deflecting means noted above in connection with a novel device for causing a sweep line produced on an oscillograph to oscillate in synchronism with the beam. With this construction, persistent indications of range and direction of remote objects included in the field through which the beam oscillates may be obtained without movement of the antenna construction. Also, such a construction reduces the speed of rotation of the antenna that is normally required to produce persistent indications of range and direction of remote objects included within a field extending 360° about the apparatus.

Although several embodiments of the present invention have been disclosed and described in detail herein, it is to be expressly understood that various changes and substitutions may be made therein without departing from the spirit of the invention as well understood by those skilled in the art. For example, with reference to the novel transmission line disclosed in Fig. 3, it is to be expressly understood that the invention is not limited to the specific construction disclosed therein but that transformer sections 38 and 39 may have characteristic impedance values different from the values designated and may comprise quarter wave sections, while the transmission line may be constructed in such a manner to serially feed a directional beam antenna having any number of antenna sections or antenna radiating elements, or to feed any number of antenna radiating elements in parallel relation. Reference therefore will be had to the appended claims as a definition of the limits of the invention.

The invention described herein may be manufactured and used by or for the Government of the United States of America for governmental purposes without the payment of any royalties thereon or therefor.

What is claimed is:

1. In combination, an oscillograph tube, a sweep circuit for producing a radial line sweep on said oscillograph, a magnetic circuit associated with said oscillograph, and means applying varying currents of alternate polarity to said magnetic circuit for producing an alternating magnetic field of continually varying strength within said oscillograph whereby the sweep line continually oscillates.

2. In combination, an oscillograph tube, a sweep circuit for producing a radial line sweep on said oscillograph, a magnetic circuit associated with said oscillograph, said circuit comprising a circular magnetic core positioned about said oscillograph, a plurality of pole members extending inwardly toward said oscillograph and angularly disposed about said oscillograph, a plurality of coils each positioned about said core between certain pairs of said poles, said coils electrically connected in series and alternately wound in opposition with respect to each other, means applying varying current of alternate polarity to said coils for producing magnetic lines of force between said poles in the plane of said sweep line, said lines of force alternately varying in direction and continually varying in strength for displacing the sweep line through a certain angle.

3. In combination, an oscillograph tube, a sweep circuit for producing a radial line sweep on said oscillograph, a magnetic circuit associated with said oscillograph, and means applying current at a varying rate to said circuit for producing magnetic lines of force within said oscillograph the strength of which varies in accordance with said varying current, the lines of force propagating in such a manner to offer no effect to displace the radial sweep line at the center of the oscillograph while offering gradually increasing displacement effect on the sweep line as the latter propagates toward the periphery of the oscillograph.

4. In combination, an oscillograph tube, a sweep circuit for producing a radial line sweep on said oscillograph, a magnetic circuit associated with said oscillograph, means applying current at a varying rate to said circuit for producing magnetic lines of force within said oscillograph the strength of which varies in accordance with said varying current, the lines of force propagating in such a manner to offer no effect to displace the radial sweep line at the center of the oscillograph while offering gradually increasing displacement effect on the sweep line as the latter propagates toward the periphery of the oscillograph, and means alternately varying the polarity of said varying current for causing said radial sweep to oscillate through a certain angle.

ROBERT M. PAGE.

No references cited.